(12) United States Patent
Figge et al.

(10) Patent No.: US 7,182,374 B2
(45) Date of Patent: Feb. 27, 2007

(54) LOCKING DEVICE WITH RELEASABLE LATCHING MEANS

(75) Inventors: Hans-Ulrich Figge, Schloss-Holte (DE); Hans-Joachim Dembowsky, Hamburg (DE); Martin Jodeleit, Bielefeld (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 140 days.

(21) Appl. No.: 10/970,582

(22) Filed: Oct. 21, 2004

(65) Prior Publication Data

US 2005/0093304 A1 May 5, 2005

(30) Foreign Application Priority Data

Oct. 29, 2003 (DE) .......................... 203 16 663 U

(51) Int. Cl.
*E05C 1/12* (2006.01)
*E05B 63/20* (2006.01)

(52) U.S. Cl. ...................... 292/334; 292/335; 292/173; 70/208

(58) Field of Classification Search ................ 292/173, 292/DIG. 49, 159, 165 X, 153, 336.3, 332–335, 292/152; 70/208, 209, 210, 215, 217, DIG. 31, 70/DIG. 67
See application file for complete search history.

(56) References Cited

U.S. PATENT DOCUMENTS

| | | | | |
|---|---|---|---|---|
| 365,675 | A | * | 6/1887 | Doud .......................... 292/334 |
| 1,330,693 | A | | 2/1920 | Fisher |
| 2,142,456 | A | | 1/1939 | Oldham |
| 2,812,204 | A | | 11/1957 | Squire |
| 4,231,597 | A | * | 11/1980 | Pelcin ......................... 292/164 |
| 4,335,595 | A | * | 6/1982 | Swan et al. ................... 70/149 |
| 5,326,141 | A | | 7/1994 | Gorman |
| 5,484,179 | A | * | 1/1996 | Mader ...................... 292/336.3 |
| 5,927,773 | A | * | 7/1999 | Larsen et al. ............... 292/337 |
| 6,152,501 | A | * | 11/2000 | Magi et al. ............... 292/336.3 |

(Continued)

FOREIGN PATENT DOCUMENTS

| | | |
|---|---|---|
| DE | 344005 | 11/1921 |
| DE | 818462 | 10/1951 |
| DE | 1120929 | 12/1961 |
| JP | 08 291 658 A | 11/1996 |
| JP | 2002 004 686 A | 1/2002 |
| JP | 2003 120 101 | 4/2003 |

*Primary Examiner*—Gary Estremsky
*Assistant Examiner*—Mark Williams
(74) *Attorney, Agent, or Firm*—Seyfarth Shaw LLP

(57) ABSTRACT

A locking device of a cover for closing an opening in a wall of a storing compartment. The locking device comprises a casing disposed within said cover, a handle pivotally mounted in said casing so as to be manually pivotal between an extended position and a retracted position in order to allow for lifting said cover from said opening and, respectively, inserting said cover into said opening, a locking bar slidably mounted in said casing so as to be displaceable between a locking position for locking said cover to said wall and an unlocking position for releasing said cover, a return spring for biasing said locking bar from said unlocking position towards said locking position, and latching means arranged to arrest said locking bar in said unlocking position when said cover has been lifted from said opening, and to release said cover when said cover has been inserted into said opening.

5 Claims, 3 Drawing Sheets

U.S. PATENT DOCUMENTS

| | | | |
|---|---|---|---|
| 6,409,234 B1 * | 6/2002 | Larsen et al. | 292/173 |
| 6,460,902 B1 * | 10/2002 | Kyle | 292/165 |
| 6,626,472 B1 * | 9/2003 | Berg | 292/336.3 |
| 6,719,332 B2 * | 4/2004 | Sekulovic | 292/170 |
| 6,877,782 B2 * | 4/2005 | Magnusson | 292/170 |
| 6,935,601 B2 * | 8/2005 | Tanaka | 248/294.1 |

* cited by examiner

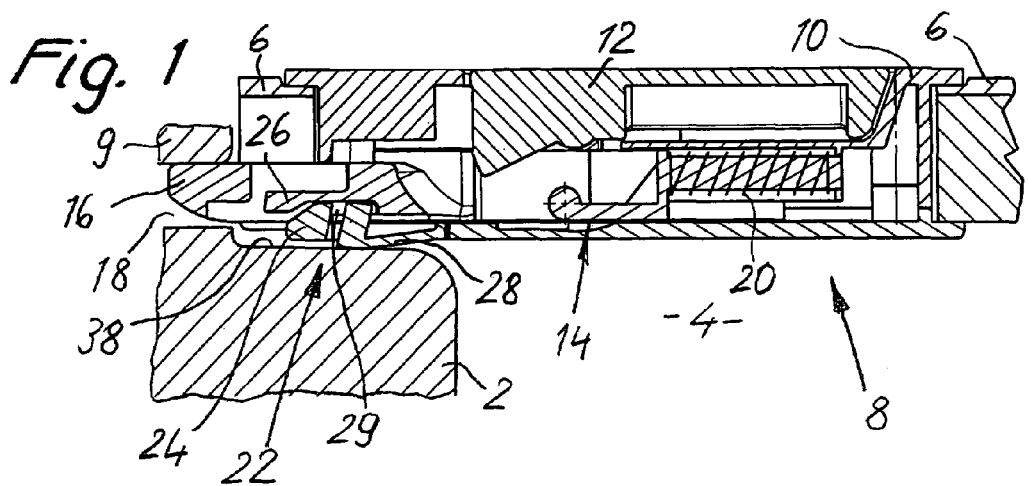
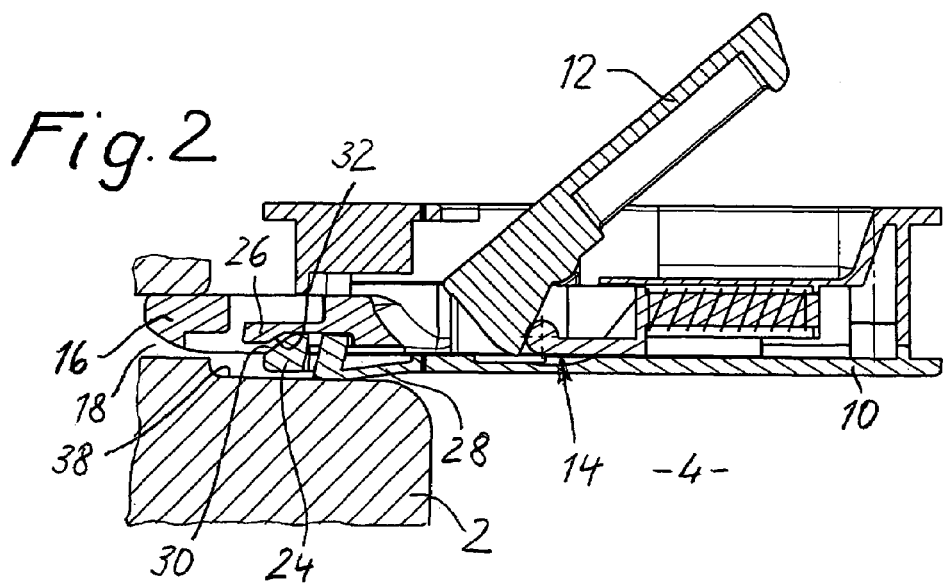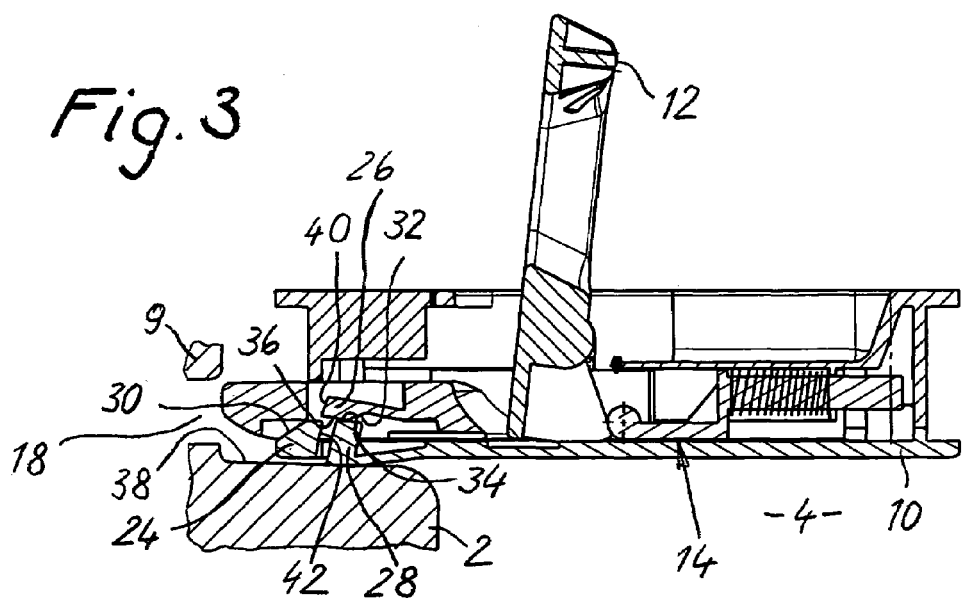

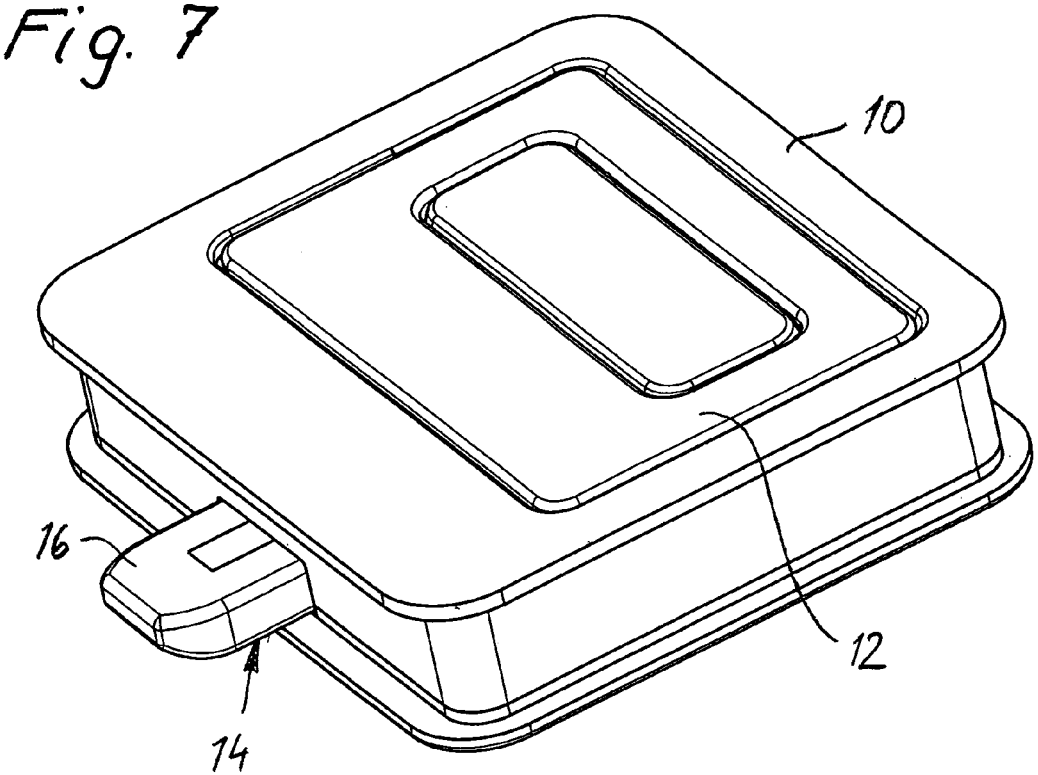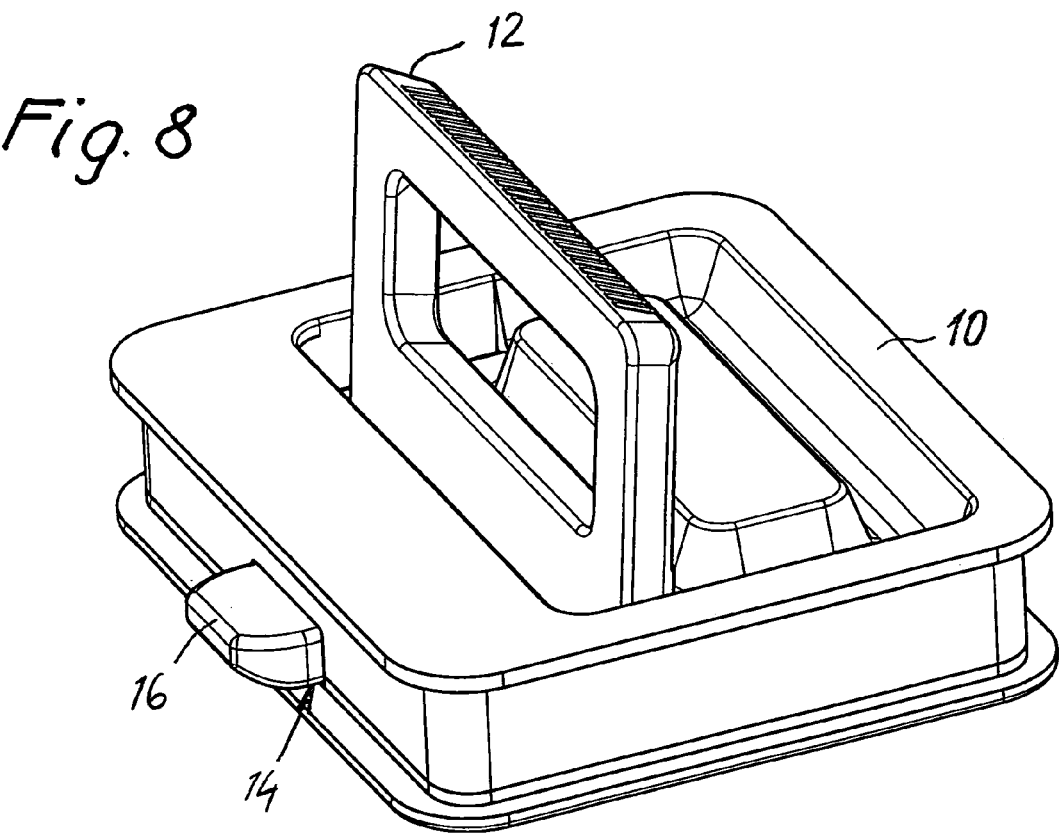

LOCKING DEVICE WITH RELEASABLE LATCHING MEANS

FIELD AND BACKGROUND OF THE INVENTION

The invention relates to a locking device of a cover for closing an opening in a wall of a storing compartment, in particular in a trunk of an automotive vehicle.

Generally such a locking device includes a pivotal handle for displacing a locking bar from a locking position to an unlocking position against the force of a return spring. When the locking bar is in the locking position, it retains the cover in its position within the trunk, and when the locking bar is in the unlocking position, it releases the loading cover so that the cover may be lifted from the opening.

There is a certain risk that the locking bar, when the cover is lifted from and inserted into the opening, may move to its unlocking position where it projects relatively far from the locking device. As a result the edge of the opening within the trunk, which is generally covered by a textile layer, may be damaged. Furthermore, the projecting locking bar renders lifting and inserting the loading cover from and into the opening relatively difficult.

SUMMARY OF THE INVENTION

It is a primary object of the invention to provide a locking device of a cover for closing an opening in a wall of a storing compartment, in particular in an automotive vehicle, with the locking device including a locking bar which does not impede lifting and inserting of the cover from and into the opening.

A locking device in accordance with the invention has been defined in patent claim 1.

The locking device of the invention includes latching means arranged to arrest the locking bar in the unlocking position when the cover has been removed from the opening and to release the locking bar when the cover has been inserted into the opening.

Accordingly, when the cover has been removed from the opening in the wall, the latching means of the invention ensures that the locking bar remains in its unlocking position, no matter which position the handle assumes. The latching means is not released even if the handle is displaced between its extended position and retracted position. Only when the cover has been inserted into the opening of the wall, the latching means is released whereupon the locking bar is moved to its locking position by the return spring.

Accordingly, the latching means of the invention ensures that the locking bar remains in its retracted unlocking position when the cover is removed and inserted from and into the opening of the wall; as a result the locking bar does not project from the cover far enough to be able to damage the edge of the opening in the wall.

In a preferred embodiment of the invention the latching means comprises a latching cam provided at the casing of the locking means, and a locking member provided at the locking bar. The latching member when in a latching position is in engagement with the latching cam so as to arrest the locking bar and when in an unlatching position is out of engagement with the latching cam so as to release the locking bar. The latching member cooperates with an unlatching spring member provided at the casing such that the unlatching spring member moves the latching member from its latching position into the unlatching position when the cover is inserted into the opening, and allows the latching member to move from the unlatching position to the latching position when the cover is removed from the opening. The unlatching spring member is arranged such that it engages an abutment surface of the wall when the cover is inserted into the opening in order to displace the latching member out of engagement with the latching cam. As a result the latching means is automatically released when the cover is inserted into the opening so that the locking bar will be moved to its locking position by the return spring. The cover will then be secured in its position by the locking bar.

Further developments and modifications of the invention have been defined in the dependent claims.

BRIEF DESCRIPTION OF THE DRAWINGS

A preferred embodiment of the invention will be described in more detail with reference to the accompanying drawings wherein FIGS. 1 to 6 are longitudinal sections of a locking device of the invention in different operative positions, and FIGS. 7, 8 are perspective views of the locking device in the operative positions of FIG. 1 and, respectively, FIG. 4.

DETAILED DESCRIPTION OF THE PREFERRED EMBODIMENT

Figure 4:
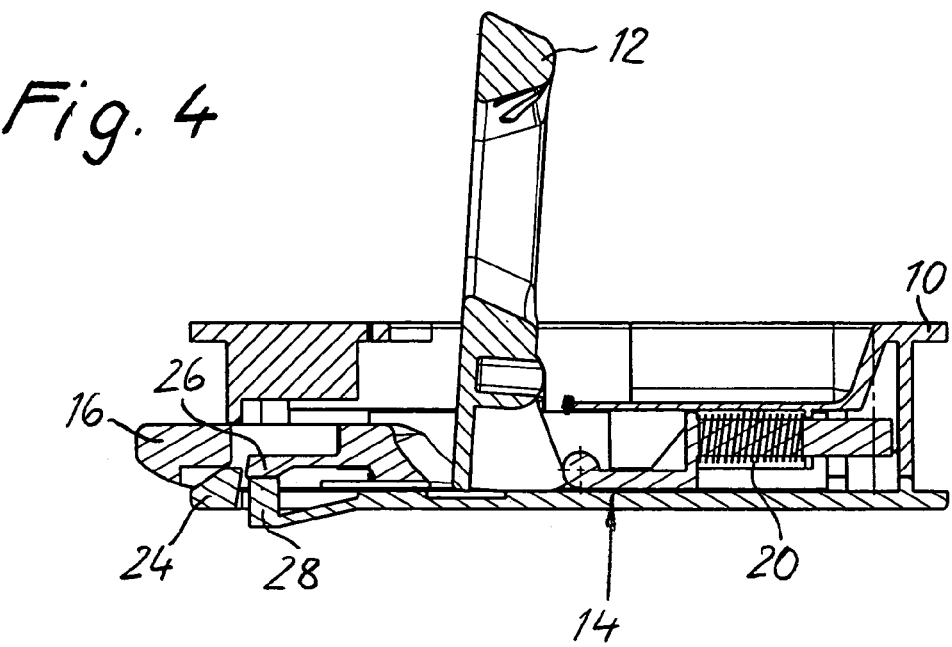

In FIG. 1, a part of a wall 2 of a storing compartment (not shown) is indicated. The wall 2 has an opening 4 which may be closed by a cover 6. The cover 6 is provided with a locking device 8 which cooperates with a support member 9 of the wall 2 to secure the cover 6 within the opening 4.

The wall 2 may be a wall of a storing compartment in a trunk of an automotive vehicle, and the cover 6 may be a loading cover to allow loading and unloading the storing compartment through the opening 4. It should be noted, however, that the locking device to be described may be used also in other applications.

The locking device 8 includes a casing 10 which is fixed within the cover 6 so as to be co-planar to the cover 6. A handle 12 is pivotally mounted within casing 10 by lateral pins (not shown) so as to be pivotal between a retracted position (FIGS. 1 and 7) and an extended position (FIGS. 3 and 8). The handle 12 when in the retracted position (FIGS. 1 and 7) is co-planar to the top surface of the casing 10 and when in the completely extended position (FIGS. 3 and 8) is inclined to the top surface of the casing 10 under an angle of about 90°. The handle 12 allows to bodily remove the cover 6 from the opening 4 of the wall 2 and to insert the cover 6 into the opening 4.

The locking device 8 furthermore includes a locking bar 14 which is slidably mounted in a channel-shaped recess within the lower portion of the casing 10 so as to be displaceable in a longitudinal direction. The handle 12 allows to displace the locking bar 14 against the force of a return spring 20 from a locking position (FIG. 1) to an unlocking position (FIG. 3). The locking bar 14 has a free end projecting from the casing 10 and provided with a locking portion 16 which, when the locking device is in the locking position, engages into a recess 18 of the support member 9 so as to secure the cover 6 in the opening 4. When the locking bar 14 is displaced from the locking position to the unlocking position (FIG. 3) by the handle 12, the locking portion 16 is withdrawn from the recess 18 of the support member 9 so that the cover 6 may be lifted from the opening 4. The return spring 20, which is disposed between an abutment surface of the locking bar 14 and an abutment surface of the casing 10, is arranged to return the locking bar 14 to its locking position as will be explained in more detail below.

The locking device 8 furthermore includes latching means 22 arranged to arrest the locking bar 14 in its unlocking position. The latching means 12 comprises a latching cam 24 provided at the casing 10, a latching member 26 provided at the locking bar 14, and an unlatching member 28 provided at the casing 10. The latching member 26 is a spring member comprised of a resilient portion integral with the latching member 14 and arranged to cooperate with the latching cam 24 such that it arrests the locking bar 14 in its unlocking position as will be explained in more detail below. The unlatching member 28 is also a spring member comprised of a resilient portion integral with the bottom of the casing 10 and arranged to be resiliently deflectable therefrom. The unlatching member 28 is intended to move the latching member 26 from a latching position to an unlatching position as will be explained in more detail below.

In the following operation of the locking device 8 and in particular of its latch means 22 will be explained.

Referring to FIGS. 1 and 7, when the cover 8 has been inserted into the opening 4 of the wall 2 and the handle 12 is in its retracted position, the locking bar 14 is urged by the return spring 20 into its locking position wherein the locking portion 16 engages into the recess 18 of the support member 9. As a result the latching means is released; in this position the latching cam 24 and the unlatching member 28 extend into a depression 29 at the bottom side of the latching member 26 so that the latching means 22 is inoperative.

Now the handle 12 may be manually pivoted upwards into the position shown in FIG. 2 without the handle 12 acting upon the locking bar 14. When the handle 12 is pivoted upwards from the position shown in FIG. 2 further to the position shown in FIG. 3, the handle 12 displaces the locking bar 14 against the force of the return spring 20 into the unlocking position wherein the locking bar 14 is retracted into the interior of the casing 8 to a large extent and the locking portion 16 of the locking bar 12 is out of engagement with the recess 18 of the support member 9.

While the locking bar 14 moves from the locking position (FIG. 2) to the unlocking position (FIG. 3), a sliding surface 32 of the latching member 26 slides across an inclined cam surface 30 of the latching cam 24 whereby the latching member 26 is resiliently deflected upwards (in the figures). While the locking bar 14 continues to move towards the unlocking position, the latching member 26 slides across the latching cam 24 to a position adjacent to the unlatching member 28 so that lateral abutment surfaces 32 and 34 provided at the free ends of the latching member 26 and, respectively, the unlatching member 28 come into contact to each other. In this position which is shown in FIG. 3, the unlatching member 28 engages an abutment surface 38 of the support member 9 so that the unlatching member 28 is retained in the position shown in FIG. 3.

The cover 6 may now be lifted bodily away from the opening 8 by means of the handle 12. When the unlatching member 28 moves away from the abutment surface 38 of the support member 9, the unlatching member 28 yields so that the latching member 26 returns to its original position due to its resiliency. At the same time the latching member 26 displaces the unlatching member 28 from the position shown in FIG. 3 to the position shown in FIG. 4. This results from the fact that the spring rate of the latching member 26 exceeds the spring rate of the unlatching member 28.

Figure 5:
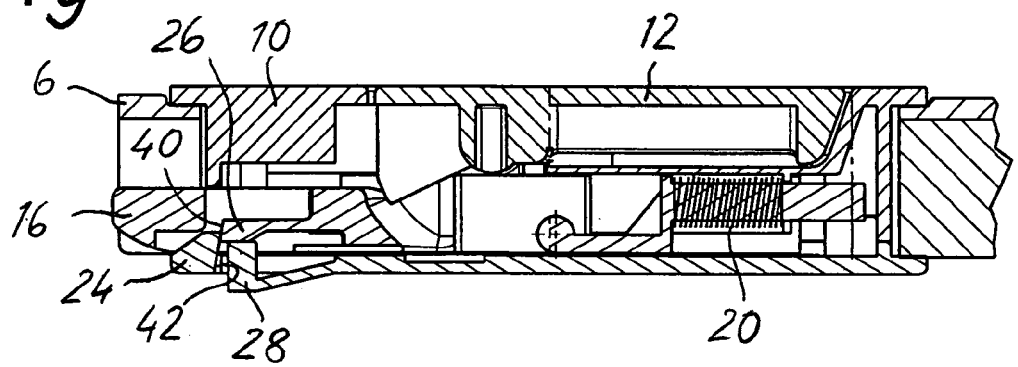
Figure 6:
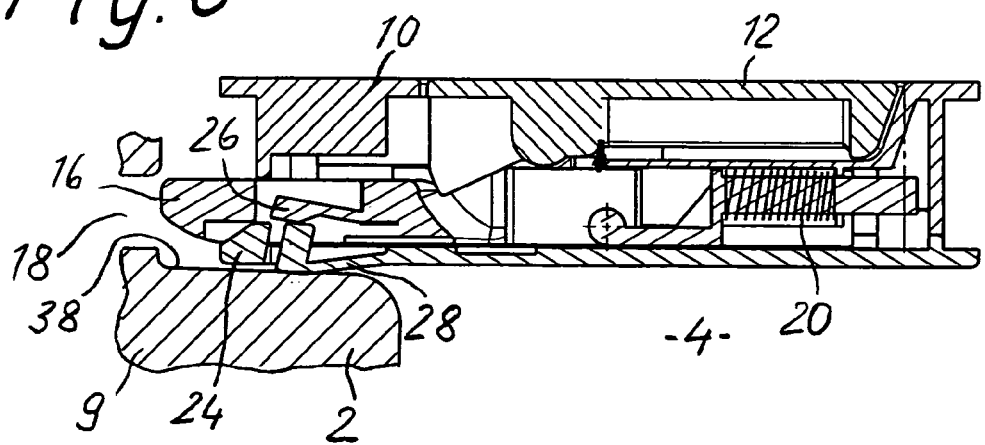

When the handle 12 is now released so as to be lowered into a handle recess of the casing 10 (FIG. 5), the return spring 20 urges the latching member 26 into engagement with the latching cam 24; as a result a latching face 40 of the latching member 26 engages a latching face 42 of the latching cam 24. The latching means 22 is now in its latching position wherein the locking bar 14 is retained in its unlocking position. Accordingly, the latching means 22 ensures that the locking bar 14 remains in its unlocking position wherein it only slightly projects from the cover 6. Therefore the locking bar 14 does not impede the cover 6 from being inserted into and removed from the opening 4.

When the cover 6 is inserted again into the opening 4 of the wall 2, the unlatching member 28 comes into engagement with the abutment surface 38 of the support member 9. As a result the unlatching member 28 is urged upwards (in the figures) so that the latching member 26 will be deflected to its unlatching position. The locking bar 14 is urged back by the return spring 20 to its unlocking position wherein the locking portion 16 projects into the recess 18 of the support member 9 in order to retain the cover 6 to the wall 2.

We claim:

1. A locking device of a cover for closing an opening in a wall of a storing compartment, the locking device comprising:

a casing disposed within said cover, a handle pivotally mounted in said casing so as to be manually pivotal between an extended position and a retracted position in order to allow for lifting said cover from said opening and, respectively, inserting said cover into said opening, a locking bar slidably mounted in said casing so as to be displaceable between a locking position for locking said cover to said wall and an unlocking position for re-leasing said cover, a return spring for biasing said locking bar from said unlocking position to-wards said locking position, and latching means arranged to arrest said locking bar in said unlocking position when said cover has been lifted from said opening, and to release said cover when said cover has been inserted into said opening, said latching means including a latching cam provided at said casing, a latching member provided at said locking bar and an unlatching spring member integrally formed with said casing, said latching member being movable between a latching position in engagement with said latching cam for arresting said locking bar, and an unlatching position out of engagement with said latching cam for releasing said locking bar, said unlatching spring member cooperating with said latching member so as to displace said latching member from its latching position to its unlatching position when said cover is inserted into said opening, and to enable the latching member to be displaced from said unlatching position to said latching position when the cover is lifted from said opening, wherein said unlatching spring member is arranged to be displaced by engaging an abutment surface of said wall when the cover is inserted into said opening to displace said latching member from said latching position to said unlatching position.

2. The locking device of claim 1 wherein said latching member is a spring member of a spring rate exceeding that of said unlatching spring member.

3. The locking device of claim 2 wherein said latching cam has an inclined cam surface to move said latching member into engagement with said unlatching spring member when said locking bar is displaced to said unlocking position so as to enable said latching member to cooperate with said unlatching spring member.

4. The locking device of claim 3 wherein said latching member is formed as a resilient portion of said locking bar and said unlatching spring member is formed as a resilient portion of said casing.

5. The locking device of claim 4 wherein said resilient portions of said latching member and said unlatching spring member have free ends with lateral abutment surfaces engaging each other to allow said latching member and said unlatching spring member to cooperate when said locking bar is in said unlocking position.

* * * * *